United States Patent [19]

Sherbrooke

[11] Patent Number: 4,848,663

[45] Date of Patent: Jul. 18, 1989

[54] GEARED ROTARY ACTUATOR

[75] Inventor: James C. Sherbrooke, Rockford, Ill.

[73] Assignee: Sundstrand Corporation, Rockford, Ill.

[21] Appl. No.: 219,793

[22] Filed: Jul. 15, 1988

Related U.S. Application Data

[63] Continuation of Ser. No. 944,762, Dec. 22, 1986, abandoned.

[51] Int. Cl.⁴ .............................................. B64C 15/00
[52] U.S. Cl. .................................. 239/265.19; 74/768
[58] Field of Search .................. 239/265.19, 265.33; 74/768, 785, 390, 391, 526

[56] References Cited

U.S. PATENT DOCUMENTS

| | | | |
|---|---|---|---|
| 2,939,344 | 6/1960 | Harris ................................... | 74/768 |
| 2,944,444 | 7/1960 | Burns . | |
| 2,966,808 | 1/1961 | Grudin . | |
| 3,008,355 | 11/1961 | Grudin . | |
| 3,015,973 | 1/1962 | Doerries . | |
| 3,202,275 | 8/1965 | Hoover . | |
| 3,774,868 | 11/1973 | Goetz ............................. | 239/265.19 |
| 3,892,300 | 7/1975 | Hapeman et al. .................... | 74/391 |
| 4,116,293 | 9/1978 | Fukui .................................... | 74/391 |
| 4,238,967 | 12/1980 | Volkov et al. ....................... | 74/785 |
| 4,254,669 | 3/1981 | Schulz . | |
| 4,291,779 | 9/1981 | Mann et al. .......................... | 74/391 |
| 4,399,081 | 8/1983 | Mabb .................................... | 74/526 |
| 4,497,461 | 2/1985 | Campbell ............................. | 74/526 |
| 4,575,027 | 3/1986 | Cronin . | |

FOREIGN PATENT DOCUMENTS

| | | | |
|---|---|---|---|
| 529679 | 6/1955 | Italy ..................................... | 74/768 |
| 865506 | 4/1961 | United Kingdom .................. | 74/526 |

Primary Examiner—Andres Kashnikow
Assistant Examiner—Michael J. Forman
Attorney, Agent, or Firm—Wood, Dalton, Phillips, Mason & Rowe

[57] ABSTRACT

According to the invention, a rotary output shaft with an external drive surface defines an internal hollow portion in axial overlapping relationship with the drive surface. A drive motor is mounted at least partially within the hollow portion of the output shaft and is connected preferably through a planetary gear system to drive the output shaft. By placing the drive motor within the output shaft, essentially the only space requirement is for the output shaft itself.

15 Claims, 2 Drawing Sheets

GEARED ROTARY ACTUATOR

This application is a continuation, of application Ser. No. 944,762, filed 12/22/86, now abandoned.

BACKGROUND OF THE INVENTION

1. Field of the Invention

This invention relates to actuator systems and, more particularly, to a system having an output shaft that is driven by a motor through a planetary gear train.

2. Background Art

Geared rotary actuator systems are commonly used on aircraft controls. These actuators are often located in very tight areas such as within engine nacelles and leading and trailing edges of aircraft wings. Because there is a premium on space and weight in aircraft construction, and in the interest of reducing aerodynamic drag, designers of aircraft controls strive to minimize the size of the actuators therefor.

A conventional actuator typically includes an output shaft to be rotated, a drive motor and structure for coupling the drive to the output shaft for rotation thereof. One application for such an actuator system is to rotate a jet engine nozzle flap. The entire actuator system is contained within the engine nacelle and, heretofore, such systems have not been space efficient.

The principal problem with the above-described system is that the drive unit and the output shaft have occupied separate spaces. The amount of space occupied by the drive unit may be significant. The nacelle must be enlarged to enclose the drive motor, resulting in an undesirable increase in drag.

SUMMARY OF THE INVENTION

It is the principal objective of the present invention to afford a simple and compact geared rotary actuator system.

According to the invention, a rotary output shaft with an external drive surface defines an internal hollow portion in axial overlapping relationship with the drive surface. A drive motor is mounted at least partially within the hollow portion of the output shaft and is connected preferably through a planetary gear system to drive the output shaft. By placing the drive motor within the output shaft, essentially the only space requirement is for the output shaft itself.

To maximize space utilization and simplify construction in the event of an hydraulic drive motor being used, the fluid supply and outlet lines are arranged in concentric manner within the shaft along the shaft axis.

A further aspect of the invention is the provision of a geared ring element having a cylindrical body with associated axially extending fingers to directly drive the output shaft. The fingers are fixed to the output shaft and are guided within slots on a fixed ring element. Torque application through the fingers is maximized within the diameter of the ring element.

The invention structure is also weight efficient by reason of there being parts eliminated that are normally required in conventional systems. The planetary gear system within the shaft serves a bearing function and obviates the need for separate structure to support the output shaft for rotation. The gear system and output shaft also support the motor to thereby eliminate motor mounting structure found in conventional systems.

A further advantage of the inventive structure having a hydraulic motor is that the planetary gear system is self-lubricating. A small amount of fluid leakage that is common with even very efficient motors is sufficient to lubricate the gear system. Because the motor occupies the same space within the output shaft as the gear train, and is in close proximity thereto, the escaping fluid will flow naturally over the gears to minimize system maintenance.

Overall, the inventive system is simple to construct and maintain, is light in weight and space efficient.

DESCRIPTION OF THE PREFERRED EMBODIMENT

Figure 1:
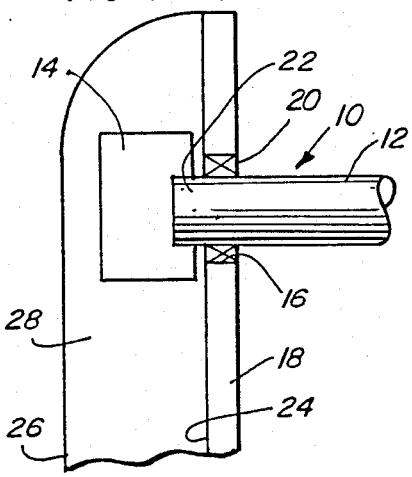
FIG. 1 is a schematic representation of a prior art geared rotary actuator system.

In FIG. 1 a prior art actuator system such as used on a jet engine nozzle flap is shown at 10. The actuator system 10 comprises generally an output shaft 12 and drive motor 14 for the shaft 12. The shaft 12 is supported for rotation within an opening 16 in the engine fire wall 18 by a bearing 20.

In the arrangement shown in FIG. 1, the motor 14 and a portion 22 of the shaft 12 are exposed at the external surface 24 of the fire wall 18. A nacelle 26 is attached to the fire wall 18 and covers the motor 14 and shaft portion 22 to streamline and protect the actuator system. It can be seen that the space 28 enclosed by the nacelle 26 is substantial and that the portion of the nacelle 26 over the drive motor 14 therefore accounts for a substantial drag.

Figure 7:
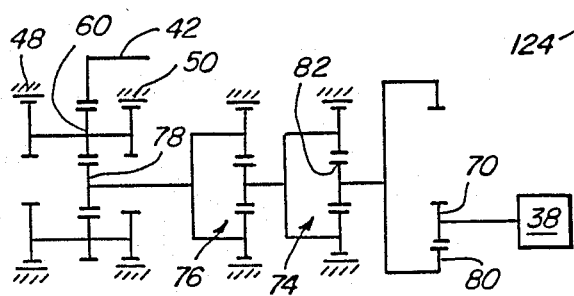
FIG. 7 is a schematic diagram illustrating the structure in FIG. 3.
Figure 8:
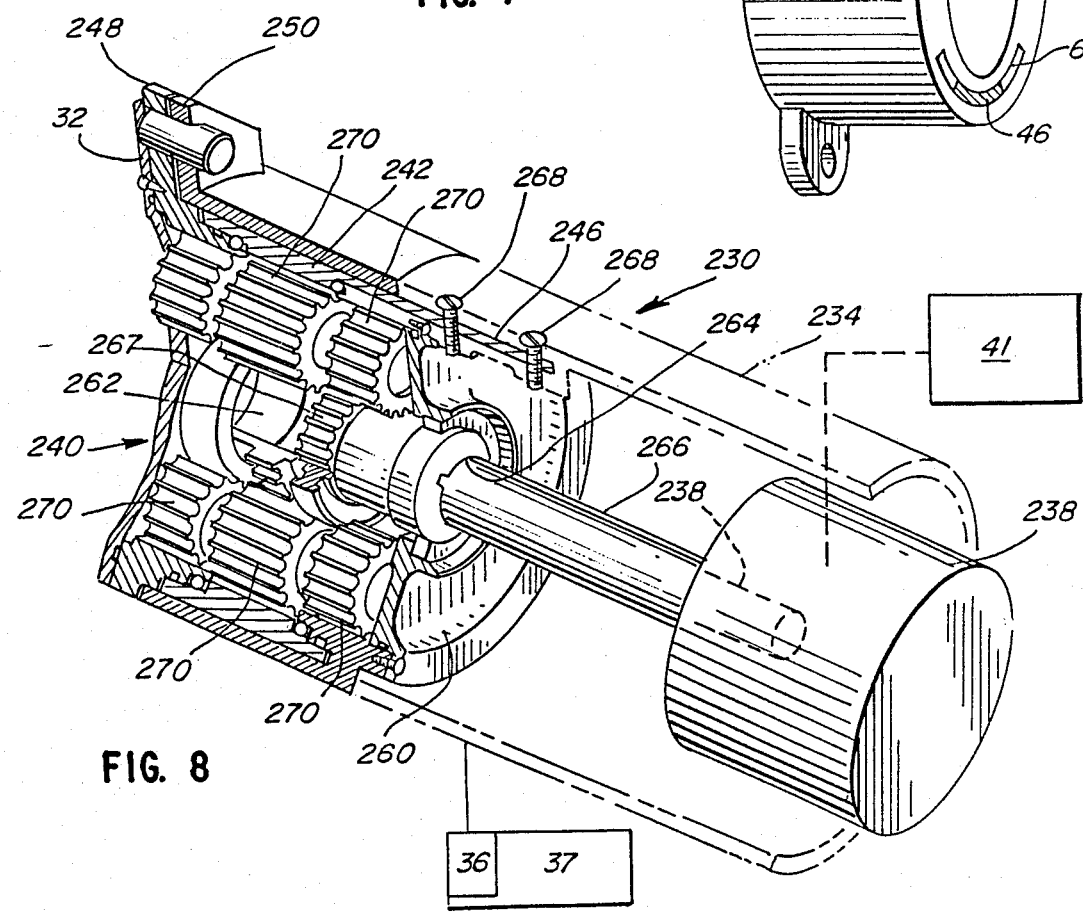
FIG. 8 is a fragmentary perspective view of a modified form of actuator system according to the present invention.
Figure 3:
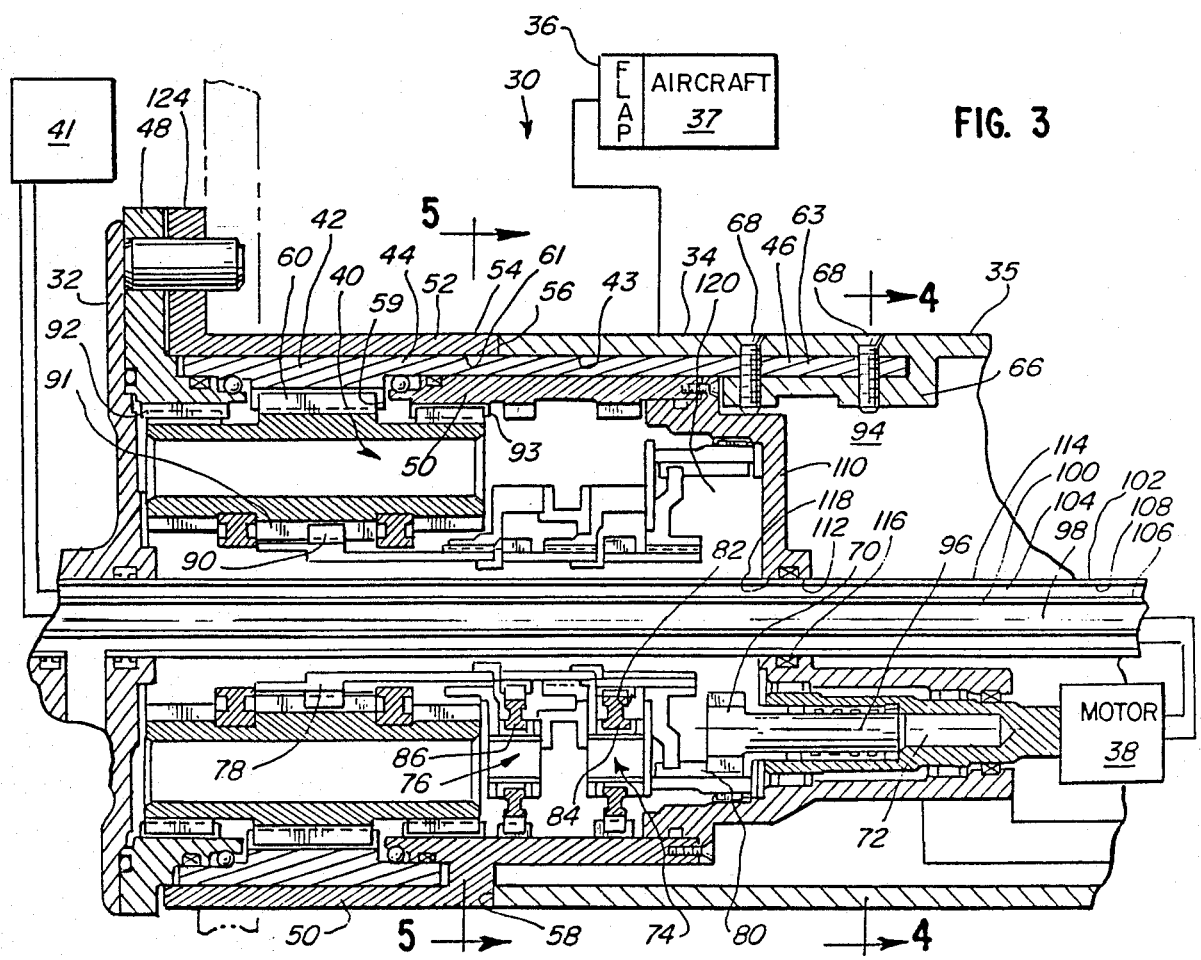
FIG. 3 is a sectional view of an actuator system according to the present invention.

Actuator systems according to the present invention are shown at 30 in FIG. 3 and 230 in FIG. 8, attached to a fire wall 32. The two systems 30, 230 differ principally in the location of the drive motor for each system, and the embodiment mechanically rendered in FIGS. 3-6 is also shown schematically in FIG. 7 for ease of understanding.

Figure 4:
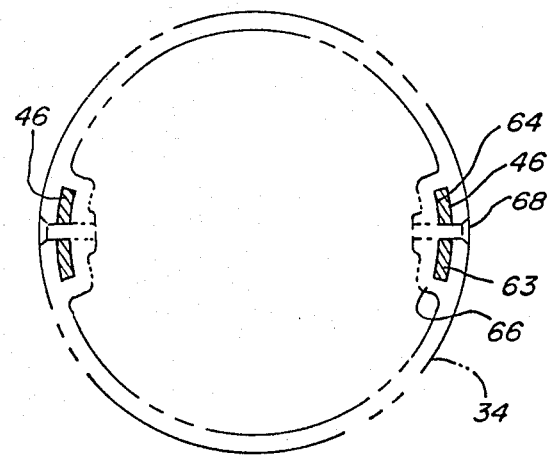
FIG. 4 is a sectional view of the actuator system taken along line 4—4 of FIG. 3.
Figure 5:
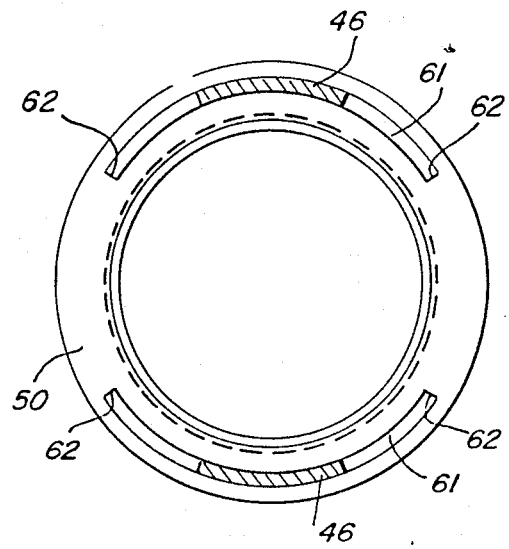
FIG. 5 is a sectional view of the actuator system taken along line 5—5 of FIG. 3.

The actuator system 30, shown in FIGS. 3-5, comprises a hollow output shaft 34 with an outer surface 35 to be drivingly connected to a control, such as a nozzle flap 36 on an aircraft 37. Rotation is imparted to the shaft 34 by a rotary input motor 38 through a planetary gear assembly generally designated 40. Operation of the motor 38, which is accomplished through a control system 41 with a pressurized supply of hydraulic fluid, effects rotation of an output ring gear 42 slidably received against the inside surface 43 of the output shaft 34. The ring gear 42 has a cylindrical body 44 with two fingers 46, extending axially to the right in FIG. 3, fixedly attached to the output shaft 34 for rotation thereof upon the ring gear 42 being driven.

The actuator system 30 is supported on the fire wall 32 principally by two fixed ring gears 48, 50. The ring gear 50 has a cylindrical casing 52 axially overlapping the gear assembly 40, with an outside surface 54 substantially matched to the diameter of the outer surface 35 of the output shaft 34. A free annular edge 56 of the ring gear 50 abuts the free edge 58 of the output shaft 34 closest to the fire wall 32.

The output ring rear 42 has teeth 59 in mesh with and driven by planet gears 60 on the gear assembly 40. The fingers 46 on the ring gear 42, as seen clearly in FIGS. 4 and 5, slide circumferentially in slots 61 in the ring gear 50. Each slot 61 is bounded at its ends by stop surfaces 62 which abut the fingers to limit rotation thereof. The dimensional relationship between the fingers and slots is such that, in the disclosed embodiment, approximately a 75° range of rotation is allowed. The free ends 63 of the fingers 46 are narrower than the portions of the fingers 46 within the slots 61 and are closely received in sockets 64, defined in thickened portions 66 of the output shaft 34. Bolts 68 pass through the shaft 34 and the free ends 63 to fixedly secure the connection therebetween. While two fingers have been shown, this is a design choice that depends in part on the range of rotation contemplated.

Operation of the motor 38 rotates an output gear 70 on the motor shaft 72. First and second conventionally connected speed reduction planetary gear sets 74, 76 transmit motion from the gear 70 to a sun gear 78 on the gear assembly 40. The output gear 70 is in mesh with a ring gear 80, which is integral with or otherwise coupled to a sun gear 82 for the gear set 74. Planet gears 84, 86 move within ring gear 50 with motion from planet gears 86 transmitted to the sun gear 78 on the gear assembly 40. The sun gear 78 has teeth 90 in mesh with toothed portions 91 on the planet gears 60. The planet gears 60 are meshed with the ring gear 50 and teeth 92 on the fixed ring gear 48. Teeth 93 on the fixed ring gear 50 are in mesh with the planet gears 60 as well.

The output shaft 34 is hollow along its length. The gear assembly 40 and gear sets 74, 76 reside within a cavity or hollow 94 bounded by the inside surface 43 of the shaft 34 adjacent the fire wall 82. The motor 38 also resides in the hollow 94 and is arranged so that the axis 96 of the motor shaft 72 is radially spaced from the rotational axis 98 of the output shaft 34. The motor 38, by reason of its residing within the shaft hollow 94, does not require any more space than the shaft 34 itself takes up. Accordingly, a very compact structure results and is a preferred alternative to the prior art structure in FIG. 1 where the motor 14 resides entirely outside of the output shaft 12. Accordingly, effectively a 100% savings in motor space is achieved over the FIG. 1 structure through use of the invention.

The motor 38 is preferably hydraulic. Another aspect of the invention is the provision of concentric conduits 100, 102 to define a hydraulic fluid circuit. The smaller diameter conduit 100 defines a fluid supply passage and a fluid return passage 104 is defined between the outer surface 106 of the conduit 100 and the inner surface 108 of the conduit 102.

The assembly, within the hollow 94, includes a bracket 110. The bracket 110 has a bore 112 to closely accept the outer surface 114 of the conduit 102. A seal 116 is interposed between the surface 118 bounding the bore 112 and the outer surface 114 of the conduit 102.

The gear assembly 40 and gear sets 74, 76 are thus effectively sealed within a chamber 120. The chamber 120 can be filled with gear lubricant to provide a self-contained lubricated geared actuator.

While a single actuator is shown in the drawings, the invention also contemplates various other arrangements for such an actuator. For example, two of the actuator systems shown in the drawing can be used with dual hydraulic motors geared in a torque summing fashion. Speed summing may also be utilized for more flexibility in system performance.

Figure 2:
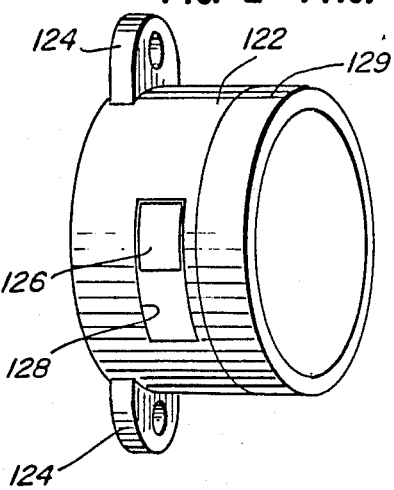
FIG. 2 is a schematic representation of the output portion of a prior art actuator system with a radially projecting output element.

The advantage of the movable ring gear 42 with associated fingers to drive the output shaft over the prior art will be described with respect to FIGS. 2 and 6. In FIG. 2 a prior art structure is shown and comprises a cylindrical internally geared casing 122 with integral mounting bosses 124. A radially projecting, rotatable output member 126 moves within a predetermined range in a slot 128 in the casing wall. The output member 126 is connected to a control (not shown) radially outwardly of the outer surface 129 of the casing.

Figure 6:
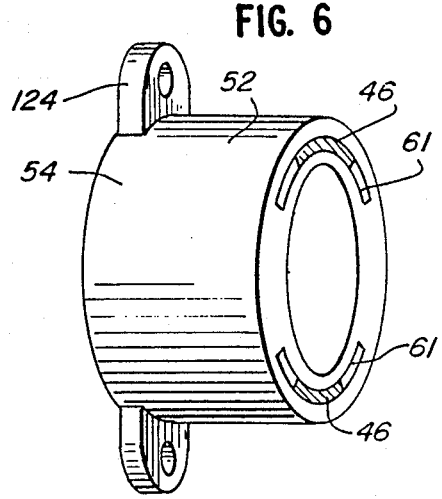
FIG. 6 is a schematic representation of the output portion of an actuator system like that shown in FIG. 2 but made according to the present invention.

In FIG. 6, the inventive structure is demonstrated in a similar casing corresponding to the casing 52 which is of the same diameter as the casing 122 and has associated mounting bosses 124. The output member in FIG. 6 comprises the two fingers 46 that are driven from within the casing for rotation within slots 61 in the casing 52. Torque application through the fingers 46 is maximized within the diameter of the outer surface 54 of the casing. A well packaged, light weight, high torque shaft actuator is thus obtained with the structure made according to the invention.

The system 230 in FIG. 8, as previously mentioned, comprises, corresponding to the FIG. 3 embodiment, an output shaft 234 driven by output ring gear 242, having associated fingers 246 secured by bolts 268 to the output shaft 234. The output shaft 234 is connected, for example, to a control surface 36 on an aircraft 37 as in the previously described embodiment. Rotary motion from a motor 238, which is hyraulically controlled, is transmitted through a planetary gear assembly 240, basically the same as the previously described system including the gears 48, 50, 60 and 78, to the output gear 242. The system 230 is supported from the fire wall 32 by fixed ring gears 248, 250, as in the previously described embodiment.

The principal distinction between the system in FIG. 8 and that in FIG. 3 is that the motor drive shaft 238 is centered on the axis of shaft 234 and the gear sets 74, 76 are omitted in favor of a more direct drive. A baffle 260 seals a chamber 262 within which the gear assembly 240 resides. The baffle 260 has an opening 264 which closely accepts a casing 266 for the motor output shaft 238. The motor 238 drives a sun gear 267 (corresponding approximately to the sun gear 78), which drives planet gears 270 and in turn output ring gear 242 and output shaft 234.

The actuation system allows the elimination of bearings used normally to support the output shaft and mounting structure for the motor. Since the motor and transmission structure are packaged in the shaft and are an integral part of the shaft, the mounting and bearing functions are performed within the shaft. The elimination of shaft bearings and conventional motor mounting structure and the concentric supply and return lines previously mentioned make for a very simple installation of this compact actuation system. Overall, it can be seen that installation is simplified, parts are eliminated and as a result the weight of the overall structure is reduced as compared to prior art systems.

I claim:

1. An improved rotary drive structure comprising:
   a rotary output shaft having an external drive surface and defining a hollow portion in axial overlapping relationship with the drive surface;
   a drive motor having a rotary output element;
   means mounting the drive motor at least partially within the hollow portion of the output shaft; and
   means connecting the output element to the output shaft so that the output shaft is rotatably driven upon the drive motor being operated,
   said connecting means comprising a first ring gear, means for transmitting rotation of the output element to the first ring gear, at least one arcuate finger integral with said first ring gear and extending through an arc of less than 360°, and means for fixedly connecting the finger to the output shaft so that a rotary force is transmitted from said first ring gear through the finger to the output shaft.

2. The improved rotary drive structure according to claim 1 wherein the drive motor is mounted so that the rotational axis of the output element is radially offset from the rotational axis of the output shaft, the drive motor is hydraulically operated and has coaxial fluid supply and return conduits, there is a fixed second ring gear against which rotation of the first ring gear is guided, a bracket extends between the second ring gear and the radially outer one of said supply and return conduits, and means support the motor on said outer one of said supply and return conduits.

3. The improved rotary drive structure according to claim 1 wherein said external drive surface is cylindrical and the connecting means reside entirely within the diameter of said drive surface.

4. The improved rotary drive structure according to claim 1 wherein said drive motor is hydraulically operated and has associated coaxial fluid supply and return conduits and means mount the conduits so that conduits are coaxially aligned with each other and with the axis of rotation of the output shaft.

5. The improved rotary drive structure according to claim 1 in combination with an aircraft having an engine with an associated movable nozzle flap and means are provided to operatively engage the output shaft with the nozzle flap.

6. The improved rotary drive structure according to claim 1 wherein said connecting means includes a fixed second ring gear, said second ring gear having an arcuate slot for guiding rotation of said finger.

7. The improved rotary drive structure according to claim 6 wherein said second ring gear has first and second stop surfaces to abut the finger and thereby limit rotation of the first ring gear with a predetermined range.

8. The improved rotary drive structure according to claim 1 wherein there is a second finger on said first ring gear connected to said output shaft.

9. The improved rotary drive structure according to claim 1 wherein there is a fixed third ring gear and at least a part of the first ring gear that is radially between and axially overlapping with both of the second and third ring gears.

10. An improved rotary drive structure for connection to a support, said rotary drive structure comprising:
    a rotary output shaft having an external drive surface with an outer diameter;
    a drive motor having an output element;
    a first ring gear;
    a second ring gear for fixed attachment to a support and in coaxial relationship with the rotary output shaft;
    a third ring gear for fixed attachment to a support and in coaxial relationship with the rotary output shaft;
    means mounting at least part of the first ring gear for guided rotation radially between the second and third ring gears;
    means for imparting rotation from the motor output element to the first ring gear; and
    means for fixedly connecting the first ring gear to the output shaft so that the output shaft follows rotation of the first ring gear.

11. The improved rotary drive structure according to claim 10 wherein said second ring gear has an arcuate slot with radially facing surfaces for guiding rotation of the first ring gear.

12. The improved rotary drive structure according to claim 11 wherein said first ring gear has an axially extending finger with a free end projecting axially through the arcuate slot in the second ring gear and the means for fixedly connecting the first ring gear to the output shaft fixedly connects the finger free end to the output shaft.

13. The improved rotary drive structure according to claim 10 wherein said output shaft defines a hollow portion in axial overlapping relationship with the drive surface and means mount the drive motor so that the drive motor is at least partially within the hollow portion of the output shaft.

14. The improved rotary drive structure according to claim 13 wherein said drive motor is hydraulically operated and has associated fluid supply and return conduits and means mount the conduits so that conduits are coaxially aligned with each other and with the axis of rotation of the output shaft.

15. The improved rotary drive structure according to claim 10 in combination with an aircraft having an engine with an associated movable nozzle flap and means are provided to operatively engage the output shaft with the nozzle flap.

* * * * *